UNITED STATES PATENT OFFICE.

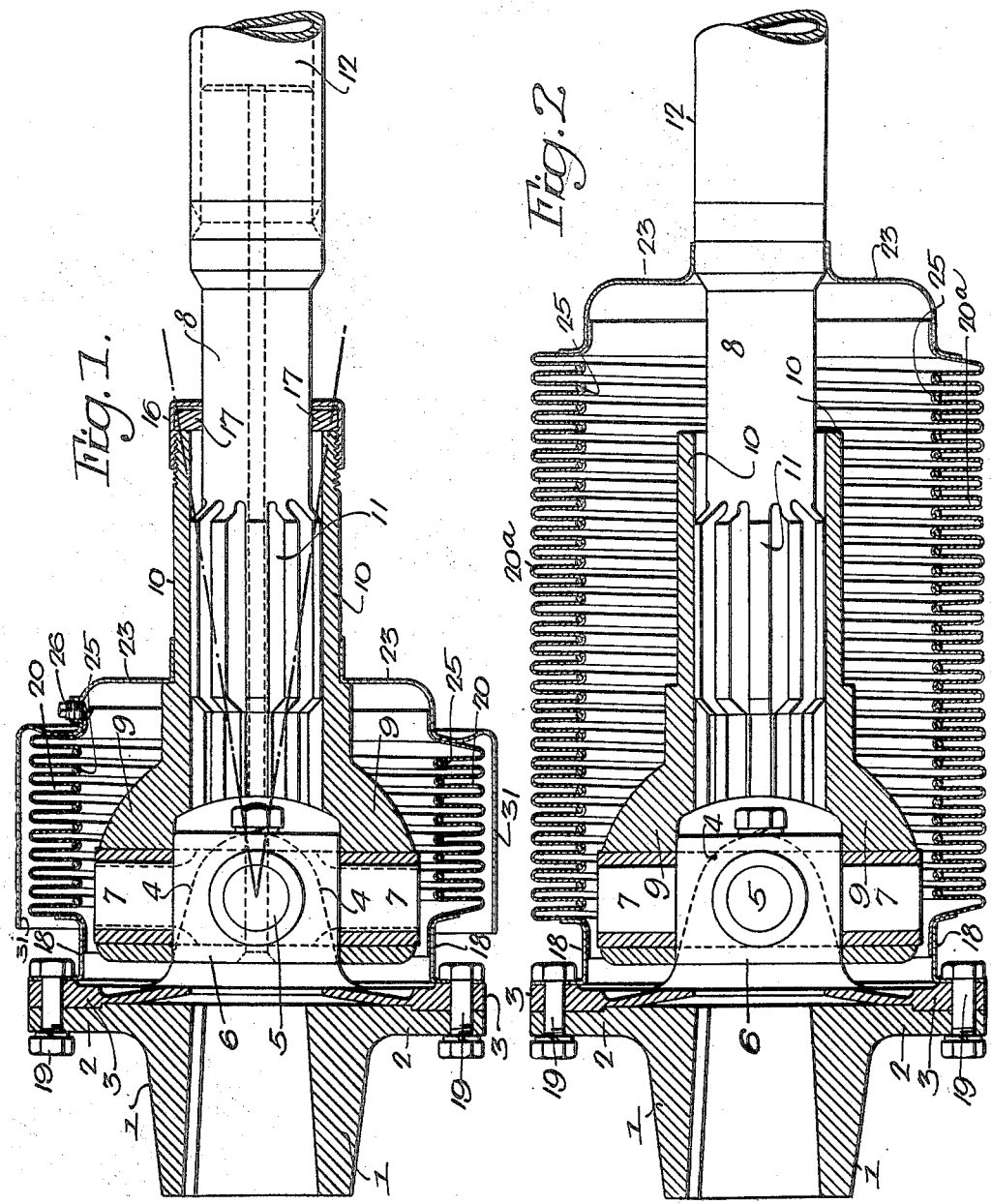

POWELL EVANS, OF PHILADELPHIA, PENNSYLVANIA.

CASING FOR UNIVERSAL JOINTS.

1,397,413.   Specification of Letters Patent.   Patented Nov. 15, 1921.

Application filed April 19, 1920. Serial No. 375,029.

*To all whom it may concern:*

Be it known that I, POWELL EVANS, a citizen of the United States, residing in Philadelphia, Pennsylvania, have invented the Casing for Universal Joints, of which the following is a specification.

One object of my invention is to provide a novel form of inclosing structure for universal joints particularly designed to effectually retain a body of lubricant and at the same time accommodate itself to the movement of the elements of the joint without causing any of its own parts to be subjected to such high or concentrated stresses as would cause their failure.

I further desire to provide a flexible, liquid tight inclosing casing particularly designed for application to power transmitting devices having relatively movable parts, which shall be of such a nature and construction as to distribute the continuous bending stresses to which it is subjected so that these shall not be concentrated at any point or points and cause excessive wear and ultimate breakage; the construction being relatively simple, inexpensive, durable and of such a nature as to be easily applied.

The invention also contemplates a novel form of bellows casing for inclosing the relatively movable parts of a machine element or the like which shall include a guard for protecting and excluding solid material from the convolutions of the bellows structure.

These objects and other advantageous ends I attain as hereinafter set forth, reference being had to the accompanying drawings, in which, Figure 1 is a vertical section of a universal joint showing my invention as applied thereto;

Fig. 2 is a longitudinal section of a joint having upon it another form of my invention and showing the casing extended to permit longitudinal as well as angular movement of the parts of the joint.

In the above drawings, 1 represents a sleeve or collar designed for the reception of or attachment to one end of a shaft and having a flange 2 which is bolted or otherwise detachably fixed to a plate 3. This latter has a pair of projecting bearing lugs indicated at 4 for the reception of pivot pins 5 mounted in or forming part of a block 6 having projecting trunnions or pintles 7 rotatably mounted in the branches of a fork 9 projecting from a sleeve 10;—there being suitable bushings respectively mounted on the pivot pins or pintles 5 and 7. This structure constitutes a universal joint of well known form and the interior of the sleeve 10 is longitudinally fluted or formed with parallel key ways for the reception of the correspondingly formed end 11 of a longitudinally movable shaft 8 which has welded to or otherwise formed integral with it one end of a tubular shaft section 12.

In that form of my invention shown in Fig. 1, an inwardly flanged ring 16 is threaded on the outer end of the sleeve 10 and confines between its flange and the end of this latter a packing ring 17 whereby the escape of liquid from the interior of the universal joint along the shaft section 11, is effectually prevented. For inclosing the universal joint and thus retaining lubricant therein, I clamp an outwardly flanged shell or sleeve 18 against the plate 3 by means of the bolts 19 whereby the latter is attached to the flange 2, and connect as by soldering or riveting to one flange of said shell, one end of a helically formed, flexible bellows 20 so that it forms a liquid tight joint therewith.

The convolutions of the bellows are made of a body of leather, sheet metal, or other suitable flexible sheet material shaped or formed of helical convolutions and its second or outer end is suitably connected to the flange or outer portion of a radially extending metal ring 23 whose inner edge is flanged to form a liquid tight joint with the sleeve 10.

For insuring that the helically formed bellows shall have any bending stresses distributed with substantial uniformity throughout its length, I mount a continuous length of spring wire 25 at the bottom or innermost portions of its convolutions, fixing the ends of said wire if desired by connecting them in suitable manner to the end portions of the bellows respectively. When so applied this wire has the form of a tubular or coiled spring and when the shaft section 11 is moved to one side of the axial line of the sleeve 1 and of the shaft keyed thereto, it so acts on the bellows 20 as to cause it to be bent to a uniform extent throughout its entire length, thereby preventing the localization of the bending to one part or convolution and the resulting production of such abnormal stresses as would cause said bellows to quickly break.

A threaded opening is at any suitable point of the casing to permit of the introduction of lubricant and this is normally closed by a plug 26.

If desired the packing 17 and its retaining ring 16 may be omitted and the helically formed bellows be extended as at 20ª to inclose the sleeve 10, as shown in Fig. 2, in which case the flanged ring 23ª would be suitably engaged with the end of the tubular shaft section 12 adjacent the section 11 so as to form a liquid tight joint therewith. In any case, the universal joint is provided with a liquid tight inclosing casing so formed as to be capable of continuously accommodating itself to the alternate expansion and compression due to the angular relation of the two shafts with which it is associated;—the construction being such that the bend due to such angularity is uniformly distributed throughout the length of the bellows rather than concentrated. If desired, the ring 23 may have fixed to or formed integral with it a sleeve 31 which is extended around but spaced away from, the convolutions of the bellows 20 so as to prevent entrance of dirt, stones, etc., and a consequent interference with its operation.

I claim:

1. The combination of a power transmitting joint; a casing inclosing the same and including a body portion formed of helical convolutions; with means for causing said convolutions to be flexed to a uniform extent when the elements of the joint are moved out of alinement.

2. The combination of a power transmitting joint; a casing inclosing the same and including a body portion formed of helical convolutions; with spring material mounted in innermost portions to said convolutions to uniformly distribute thereto the flexing stress occurring when the elements of the joint are moved out of alinement.

3. The combination of a power transmitting joint; a liquid tight casing inclosing the same and including a flexible body portion having helical convolutions; with a helical spring wire mounted in the convolutions.

4. The combination of a power transmitting joint; a flexible casing inclosing the same and including a body portion formed of a series of flexible convolutions; with a sleeve fixed to one of the members of the joint and extending over said casing body.

5. The combination of a universal joint; a shaft section connected to one of the elements thereof and longitudinally movable relatively to said elements; with a liquid tight casing inclosing said joint and having its ends respectively connected to said shaft section and to said joint, said casing including a flexible body portion formed of helical convolutions.

6. The combination of a universal joint; a shaft section connected to one of the elements thereof and longitudinally movable relatively thereto; a liquid tight casing inclosing said joint and havings its ends respectively connected to said shaft section and to said joint, said casing including a flexible body portion formed of helical convolutions; with means for uniformly distributing throughout the body portion the bending stresses occurring when the shaft and a part of the joint are out of alinement.

7. As a new article of manufacture a casing consisting of a helical series of flexible convolutions; and a helical spring wire mounted in said convolutions for uniformly distributing bending stresses thereto.

8. As a new article of manufacture a casing consisting of a series of flexible convolutions; with a sleeve connected at one end to said casing and extending around the same substantially coaxial therewith.

POWELL EVANS.